Sept. 1, 1964
L. H. COOK
3,147,174
LOW MOISTURE UREA MELT
Filed Oct. 14, 1959
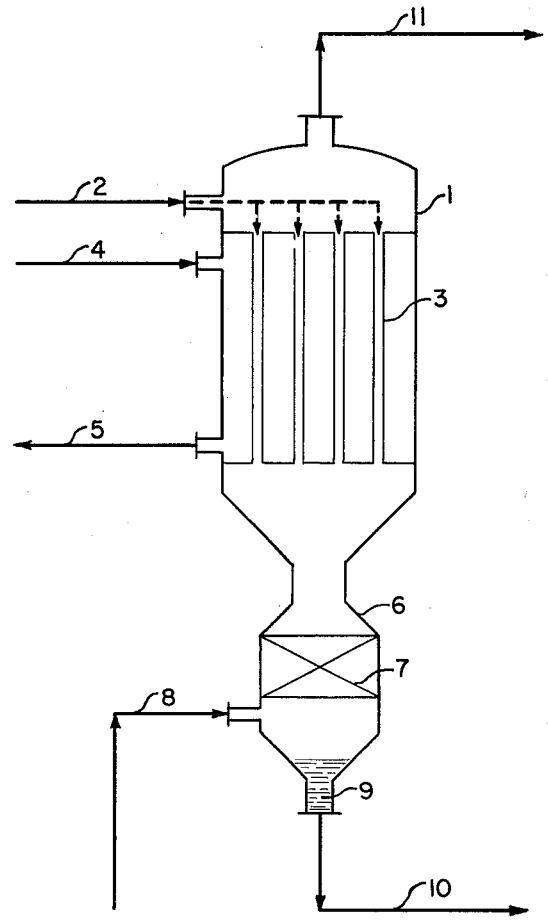
LUCIEN H. COOK
INVENTOR.
BY J. T. Chaloty
AGENT United States Patent Office 3,147,174
Patented Sept. 1, 1964

3,147,174
LOW MOISTURE UREA MELT
Lucien H. Cook, Port Washington, N.Y., assignor to Chemical Construction Corporation, New York, N.Y., a corporation of Delaware
Filed Oct. 14, 1959, Ser. No. 846,270
2 Claims. (Cl. 159—47)

This invention relates to the processing of urea solution prior to urea product formation by operations such as prilling. A process of water removal has been devised, whereby substantially anhydrous urea melt is produced by contacting the urea solution with a drying gas while maintaining a partial vacuum during the drying operation. The use of a drying gas combined with partial vacuum results in the production of urea melt with very low moisture content at moderate temperatures. Consequently, a final product is produced which attains a new low in content of impurities such as water, biuret and ammonia.

The synthesis of urea produces an aqueous urea solution containing 20% to 30% water. In order to produce a final urea fertilizer product by operations such as prilling, it is necessary to remove this water to the greatest possible extent. This operation is usually carried out by vacuum evaporation; and produces a urea melt containing about 2% to 3% or more of water. The urea melt is then prilled, with the result that a considerable proportion of water remains in the final solid prill product. Some commercial installations have attempted to remedy this by supplying an additional prill dryer to further dry the solid urea prills. This is an undesirable solution for several reasons. The additional processing step results in extra cost, both in capital and operating expenses. Further, heating of the prills can result in the formation of the undesirable urea decomposition compound biuret. Formation of biuret also results in the liberation of free ammonia which is also a highly undesirable impurity in the urea product.

Attempts to produce a urea melt with less than 2% water by standard vacuum evaporation methods have been unsuccessful. These processes employ a film-type rotary evaporator also known as a turbo-film vacuum evaporator, in which a rotor is used to maintain and distribute a film of the liquid melt over the evaporator tube surface. The liquid usually flows vertically downward through the evaporator under the influence of gravity, with the rotor blades moving about a vertical axis.

Typical operation conditions for the process are . . . a temperature between 280° F. to 300° F. and total pressure of 180 to 300 mm. Hg absolute. These conditions produce an equilibrium product with 2% to 3% water content. It has been found that higher operating temperatures are highly undesirable due to biuret formation. The rate of biuret formation is a function of temperature, and above 300° F. the rate of biuret formation is rapidly accelerated. It has also been known that operation at lower absolute pressures results in excessive formation of solid urea on the evaporator surfaces. This causes considerable mechanical difficulty in evaporator operation, due to high motor amperage and high torque required, when the rotor has to shear or break solid urea crystals. Binding of the evaporator rotor may occur. Thus the concentration of urea solution prior to prilling has heretofore been limited to solutions containing 2 to 3% water.

It is an object of this invention to produce a urea melt with low moisture content.

Another object is to produce a urea melt with less than 2% water and low biuret content.

A further object is to produce a substantially anhydrous urea melt from an aqueous urea solution without the formation of solid urea.

These and other objects of the invention will become apparent from the description of the invention which follows.

A consideration of theoretical and experimental equilibrium data indicated that highly concentrated urea solutions containing 1% or less water should exist as liquids, at absolute pressures below 180 mm. Hg and temperatures of 280° F. to 300° F. Thus it appeared that the formation of solid urea when 70%–80% urea solutions were concentrated at absolute pressures below 180 mm. Hg was a transient zone phenomenon. In other words, a region of equilibrium solid urea formation exists when urea solutions are concentrated at absolute pressures below 180 mm. Hg. Actually, some solid urea formation will take place at absolute pressures up to 230 mm. Hg. With concentration of the solution beyond this region, no solid urea could exist at equilibrium.

Thus the practical problem of concentrating urea solutions to above 99% urea at temperatures below 300% F. while skirting around and avoiding the region of solid formation was considered. The obvious expedient of concentrating in two vacuum evaporators, with the first maintained at an operation absolute pressure above 180 mm. Hg and the second at an extremely low absolute pressure, was considered. However, this arrangement would be extremely costly and would also result in practical operating difficulties. Thus the urea retention time under conditions of vacuum and high temperatures would be increased, which could lead to excessive biuret formation and liberation of free ammonia.

In the present invention, the desired result is accomplished by removal of water at a single level of operating pressure. The solution is first concentrated to about 97.5% urea at a temperature of 280° F.–300° F. in a standard vacuum evaporator. The urea melt, still under vacuum, is then contacted with a drying gas stream to remove the final portion of water. The gas stream may be any gas capable of absorbing water which would not exert an adverse effect on the urea product. Preferably, heated atmospheric air is employed. This process produces a highly concentrated urea melt containing less than 1% water, and in fact usually less than 0.5% water, in a simple and efficient manner. The process of this invention is thus preferably operated so as to produce a 99.5% to 99.75% urea melt, which is the most desirable range for finishing operations such as prilling.

It has been found that operating at absolute pressures above 300 mm. Hg is relatively undesirable, since considerably longer evaporator hold-up is required to attain equilibrium and the capacity of the evaporator is thereby considerably reduced. Also, operation above 300 mm. Hg absolute pressure results in the retention of increasingly larger percentages of water in the evaporator product melt. Subsequent removal of this large quantity of water in the gas stream requires uneconomically large quantities of gas and makes the process impractical. Likewise, operation below 180 mm. Hg absolute pressure is not satisfactory due to solids formation in the evaporator.

A preferred operating pressure is 265 mm. Hg since it has been found that this pressure level is the lowest one which avoids solids formation due to process fluctuations and upsets. The basic manipulative steps of the process of the present invention are shown in the figure. Referring to the figure, apparatus unit 1 is an evaporator, in which incoming urea solution stream 2 is dispersed onto the inner surfaces of tubes 3. Other types of evaporation or concentrating apparatus, such as the film-type rotary evaporator described supra, may be employed to accomplish the initial solution concentration function of unit 1.

Stream 2 is derived from a urea synthesis process or other source, and typically contains 20% to 30% water content. As stream 2 flows downward within tubes 3, evaporation of water and concentration of the urea solution takes place. Tubes 3 are externally heated by steam admitted via 4, with condensate removal via 5. Thus the evaporation process within tubes 3 takes place at a temperature usually between about 280° F. to 300° F. with a vacuum also preferably applied to the system as mentioned supra.

The concentrated urea solution, now containing about 2% to 3% water, passes downwards out of unit 1 and enters gas scrubber unit 6 provided with packing 7 or other gas-liquid contact means such as bubble caps. A stream 8 consisting of air or other suitable gas, preferably heated, is passed into unit 6 below packed section 7, and rises countercurrent to the descending hot urea solution. The gas stream removes the final proportion of water content from the urea and substantially anhydrous urea melt with low biuret content is collected at 9 and removed via 10. Stream 10 analyzes at least 99.5% to 99.75% urea, and is now passed to finishing operations such as prilling.

The gas stream 8, after passing up through packed section 7, preferably continues upwards through tubes 3 in unit 1. Thus the rising gas stream passing upwards through tubes 3 picks up the large quantity of water vapor released from downflowing aqueous urea solution 2. The combined gas and water vapor stream leaves unit 1 via upper outlet 13, which extends to a vacuum source, not shown, which draws a vacuum over the entire system. It should be understood that separate vacuum effects may be maintained over units 1 and 6.

Following is an example which describes a preferred embodiment of this invention.

*Example*

Aqueous urea solution containing 30% water was concentrated to 97.5% urea content in a turba-film vacuum evaporator. Operating conditions were 265 mm. Hg absolute pressure and temperature of 290° F. The 97.5% urea solution was then dried to 99.5% urea melt by contact with a stream of drying gas consisting of atmospheric air heated to 285° F. Contact between the 97.5% urea solution leaving the evaporator and the drying air stream was accomplished in a scrubbing tower packed with Raschig rings. The air stream was admitted into the base of the tower through a distributor pipe, while the urea solution passed directly from the base of the evaporator into the tower top by gravity feed. Operating conditions in the tower were 265 mm. Hg absolute pressure and temperature of 285° F. Under these conditions an air flow of about 0.7 lb. air per lb. of urea was required for the final drying.

The product 99.5% urea melt was then prilled by conventional means. For test purposes, the system was also operated without the drying air flow. A comparison of impurities content of the final prilled products was as follows:

|  | Prills Produced With Air Flow | Prills Produced Without Air Flow |
|---|---|---|
| Percent Biuret | 0.5 to 0.95 | 0.75 to 1.1 |
| Percent Total Water | 0.17 to 0.29 | 0.33 to 0.64 |
| Free Ammonia, p.p.m | 125 to 200 | 423 to 524 |

Thus it is evident that the use of the drying air stream as a supplement to the standard vacuum evaporation produces a considerable improvement in the final urea product.

The above discussion of a preferred embodiment of this invention is intended primarily for descriptive purpose, and should not be interrupted to limit or restrict the invention. Thus, other methods of gas-liquid contact besides the aforementioned packed tower may be used for the purposes of this invention. Likewise, the drying gas may be any suitable gas which will not produce any adverse effects on the urea product. Thus, for example, filtered flue gas might be economically used as the drying gas.

I claim:

1. Process for producing a urea melt containing at least 99.5% urea which comprises contacting a concentrated urea solution containing about 2.5% to 3% water with a stream of preheated gas at a temperature in the range of 280° F. to 300° F., and maintaining the total gas phase pressure between about 180 to 300 mm. Hg absolute, whereby water is vaporized from said urea solution into said stream of preheated gas without formation of a solid urea phase.

2. Process of claim 1, in which said stream of preheated gas consists of atmospheric air which is preheated to a temperature of about 285° F. before contact with said urea solution.

References Cited in the file of this patent

UNITED STATES PATENTS

| 2,267,133 | Porter | Dec. 23, 1941 |
| 2,916,516 | Michelitsch | Jan. 7, 1957 |
| 2,933,526 | Guyer et al. | Apr. 19, 1960 |
| 2,933,527 | Guyer et al. | Apr. 19, 1960 |

FOREIGN PATENTS

| 224,126 | Australia | Apr. 17, 1958 |
| 819,030 | Great Britain | Aug. 26, 1959 |